United States Patent
Zoeke

(10) Patent No.: US 10,782,402 B2
(45) Date of Patent: Sep. 22, 2020

(54) METHOD FOR DETERMINING A POSITION OF AT LEAST TWO SENSORS, AND SENSOR NETWORK

(71) Applicant: SIEMENS AKTIENGESELLSCHAFT, Munich (DE)

(72) Inventor: Dominik Zoeke, Nuremberg (DE)

(73) Assignee: SIEMENS MOBILITY GMBH, Munich (DE)

( * ) Notice: Subject to any disclaimer, the term of this patent is extended or adjusted under 35 U.S.C. 154(b) by 899 days.

(21) Appl. No.: 15/102,128

(22) PCT Filed: Dec. 1, 2014

(86) PCT No.: PCT/EP2014/076062
§ 371 (c)(1),
(2) Date: Jun. 6, 2016

(87) PCT Pub. No.: WO2015/082383
PCT Pub. Date: Jun. 11, 2015

(65) Prior Publication Data
US 2016/0306038 A1  Oct. 20, 2016

(30) Foreign Application Priority Data
Dec. 6, 2013 (DE) .................. 10 2013 225 164

(51) Int. Cl.
*G01S 13/87* (2006.01)
*G01S 17/58* (2006.01)
(Continued)

(52) U.S. Cl.
CPC .............. *G01S 13/876* (2013.01); *G01S 5/12* (2013.01); *G01S 7/295* (2013.01); *G01S 7/40* (2013.01);
(Continued)

(58) Field of Classification Search
CPC ...... G01S 13/58; G01S 13/876; G01S 13/878; G01S 17/58; G01S 17/87; G01S 5/12;
(Continued)

(56) References Cited

U.S. PATENT DOCUMENTS 7,889,116 B2 * 2/2011 Harada ................... G01S 13/87
342/59
8,730,457 B2 5/2014 Rothenberger
(Continued)

FOREIGN PATENT DOCUMENTS

CN       1384370 A    12/2002
CN     102288957 A    12/2011
(Continued)

OTHER PUBLICATIONS

PCT International Search Report and Written Opinion of the International Searching Authority dated Feb. 19, 2015 for corresponding PCT/EP2014/076062.
(Continued)

*Primary Examiner* — Timothy X Pham
(74) *Attorney, Agent, or Firm* — Lempia Summerfield Katz LLC

(57) ABSTRACT

In a method for determining a position of at least two sensors in relation to one another, a moving object is sensed by the at least two sensors, and at least one movement variable for the moving object is determined by one of the sensors, at least said movement variable or variables derived therefrom being used jointly for determining a position of the sensors in relation to one another. The sensor network is designed to carry out a method of said kind.

9 Claims, 4 Drawing Sheets

(51) Int. Cl.
| | |
|---|---|
| *G01S 17/87* | (2020.01) |
| *G01S 7/295* | (2006.01) |
| *G01S 7/40* | (2006.01) |
| *G01S 7/48* | (2006.01) |
| *G01S 7/497* | (2006.01) |
| *G01S 13/58* | (2006.01) |
| *G01S 5/12* | (2006.01) |

(52) U.S. Cl.
CPC ............ *G01S 7/4808* (2013.01); *G01S 7/497* (2013.01); *G01S 13/58* (2013.01); *G01S 13/878* (2013.01); *G01S 17/58* (2013.01); *G01S 17/87* (2013.01)

(58) Field of Classification Search
CPC .......... G01S 7/295; G01S 7/40; G01S 7/4808; G01S 7/497; G01S 13/931; G01S 17/026; G01S 17/42; G01S 7/4817; G01S 13/42; G01S 13/60; G01S 13/726; G01S 13/86; G01S 13/867; G01S 2013/9353; G01S 2013/9364; G01S 2013/9367; G01S 2013/9375; G01S 7/2955; G01S 7/4004; G01S 17/06; G01S 17/89
USPC ........................................................ 342/109
See application file for complete search history.

(56) References Cited

U.S. PATENT DOCUMENTS

| | | | |
|---|---|---|---|
| 2006/0047471 | A1 | 3/2006 | Krumm |
| 2006/0195291 | A1* | 8/2006 | Krumm .................... G01C 3/08 702/150 |
| 2008/0272958 | A1* | 11/2008 | Schiffmann ........... G01S 13/878 342/118 |
| 2009/0040094 | A1* | 2/2009 | Harada .................... G01S 13/87 342/59 |
| 2011/0295549 | A1 | 12/2011 | Takabayashi et al. |
| 2012/0140202 | A1* | 6/2012 | Rothenberger ....... G01S 7/4817 356/4.01 |
| 2013/0335569 | A1 | 12/2013 | Einecke et al. |
| 2014/0266163 | A1* | 9/2014 | Schaffer ................. G01P 3/487 324/207.13 |

FOREIGN PATENT DOCUMENTS

| | | |
|---|---|---|
| EP | 2461181 A1 | 6/2012 |
| JP | 2013190421 A | 9/2013 |

OTHER PUBLICATIONS

Chinese Office Action for related Chinese Application No. 201480066554.X dated Jul. 4, 2017.

* cited by examiner

METHOD FOR DETERMINING A POSITION OF AT LEAST TWO SENSORS, AND SENSOR NETWORK

CROSS-REFERENCE TO RELATED APPLICATIONS

This application is the National Stage of International Application No. PCT/EP2014/076062, filed on Dec. 1, 2014, which claims the benefit of German Patent Applications DE 102013225164.5, filed on Dec. 6, 2013, and DE 102014224514.1, filed on Dec. 1, 2014. The entire contents of these documents are hereby incorporated herein by reference.

TECHNICAL FIELD

The present embodiments relate to a method for determining an arrangement of at least two sensors, and relate to a sensor network.

BACKGROUND

In sensor networks, in particular in sensor networks with wireless sensors (e.g., radio sensors), measurement information from a plurality of sensors is regularly combined and evaluated together. The combination of the measurement information from a plurality of sensors typically requires precise knowledge regarding an arrangement of the sensors in relation to one another. Compared to individual sensors, arranging a plurality of sensors requires much outlay to install, service or modifying sensor networks because determining the arrangement of the sensors of the sensor network in relation to one another regularly requires the aid of additional measuring instruments (e.g., laser rangefinders) in order to determine the relative arrangement of the sensors in relation to one another after installing the sensor network.

In the case of cooperative sensors of a sensor network and a direct line of sight between the sensors, use of sensor-to-sensor communication is known for the purposes of determining the arrangement of the sensors in relation to one another. By way of example, distances and angles between the sensors are established by multilateration methods.

Furthermore, it is known to use a satellite-assisted detection of the sensors of the sensor network or to estimate the positions of the sensors based on a plurality of distributed stationary landmarks with known positions.

However, the aforementioned methods often use only distance, and optionally use angle information from at least three sensors or at least three radio signal sources. Moreover, it is often necessary in the aforementioned methods to use signal sources, landmarks or suitably available satellites.

SUMMARY AND DESCRIPTION

The scope of the present invention is defined solely by the appended claims and is not affected to any degree by the statements within this summary.

The present embodiments may obviate one or more of the drawbacks or limitations in the related art. For example, it is an object of the present embodiments to develop a method for determining an arrangement of at least two sensors in relation to one another, by which a relative arrangement of even only two sensors in relation to one another may be performed in an uncomplicated and robust manner. Furthermore, it is an object of the embodiments to specify a sensor network by which the method is easy to carry out.

In a method according to the present embodiments for determining an arrangement of at least two sensors in relation to one another, a moving object is detected by at least two sensors and a movement variable of the moving object is established by one of the sensors, wherein at least this movement variable or variables derived therefrom are used together for determining a relative arrangement of the sensors in relation to one another.

Expediently, the method according to the present embodiments is carried out for determining an arrangement of at least two wireless sensors (e.g., optical sensors, radar sensors, sonar sensors and/or lidar sensors).

The method according to the present embodiments does not require additional aids for determining the arrangement of the sensors in relation to one another. Merely using measured values from the sensors themselves suffices for the purposes of determining the arrangement. The method according to the present embodiments renders it possible to significantly reduce the outlay associated with a first installation, servicing or modifying a sensor network. In particular, the method according to the present embodiments requires no additional infrastructure (e.g., there is no need to provide a satellite signal such as a GPS signal). Moreover, it is not necessary to provide active tags (e.g., radio or radar targets). The independence of the method according to the present embodiments renders possible particularly high flexibility when using this method (e.g., the method opens up free spaces when arranging sensors of a sensor network). Thus, a line of sight connection between two of the sensors of the sensor network is not mandatory. Using the method according to the present embodiments, it is possible to significantly reduce the servicing outlay. By way of example, a new determination of the arrangement of the sensors in relation to one another may be carried out in a time-controlled manner (e.g., according to a predetermined temporal roster). As an alternative to a provided temporal roster, it is possible to establish a need for a renewed determination of the arrangement of the sensors by statistical evaluation methods and, if necessary, to start a new determination of the arrangement of the sensors in relation to one another.

The core of the methodology of the method according to the present embodiments lies in using the time evolution of trajectories of the object, detected by the sensors, in the case of the movement thereof for the purposes of inherent localization of the sensors. From the view of each sensor, the trajectory of the object passes over a different but unique path (e.g., dependent on the type of the detected movement variables or the measured values underlying the detected movement variables). Deviation of these different trajectories from one another reflects the underlying arrangement of the sensors and is used by the method. Here, the term "trajectory" refers to the position of the target in Cartesian coordinates and relates in general terms to the profile of the movement variables or measured values underlying the movement variables expressed as a mathematical function.

In principle, the method according to the present embodiments may not require parameterization (e.g., a complicated algorithmic adaptation to the respective sensors). Thus, an adaptation to peculiarities of the surroundings may be dispensed with. Instead, the method according to the present embodiments is based on establishing and using a movement variable or a variable derived therefrom. In this manner, it is also possible to use the method according to the present embodiments in sensor networks of heterogeneous sensor systems (e.g., including various sensor types and/or sensor configurations). The method according to the present embodiments may be carried out in a corresponding manner for a multiplicity of wireless sensors for as long as the corresponding movement variables, which are explained in more detail below, are detectable.

In the method according to the present embodiments, the relative arrangement of the sensors in relation to one another includes at least the relative orientation of the sensors in relation to one another.

The at least one movement variable established by one of the sensors includes at least the movement direction of the moving object, at least relative to the sensor. From the view each one of the sensors, the moving object moves along a different, but unique, trajectory. The deviation of these different trajectories of the individual sensors from one another reflects the underlying differing arrangement of the individual sensors. In particular, the different orientations of these trajectories are correlated with the different orientations of the individual sensors. Consequently, it is possible to deduce the orientation of individual sensors in relation to one another from the deviation of the trajectories among themselves. The movement direction within the scope of this application is either a current movement direction of the moving object at a specific instant or a movement direction of an object moving along a straight line. The movement direction remains unchanged during a time interval. It is understood that a movement direction relative to the sensor may be understood to mean a movement direction relative to an orientation of the sensor. Expediently, the movement direction of the moving object is established by each one of the sensors in the method according to the embodiments such that the time derivative of the projection trajectory of the moved object (e.g., the time derivative in two or three spatial coordinates) is detected first. The velocity vector detected thus specifies the movement direction with the orientation thereof. Suitably, the velocity vector may be normalized in terms of the magnitude thereof.

By way of example, the velocity vector of the moved object may be established with each of the sensors such that use is made of such a sensor which is configured to detect the distance of the object from the center and to detect the direction of the object, in which the latter is situated when viewed from the sensor. By way of example, the distance may be established by a time-of-flight measurement of the signal emitted by the sensor, and the signal is reflected by the object and subsequently detected by the sensor again. The direction of the object may be determined (e.g., by the phase-sensitive detection of the reflected radio signal). The angles between the movement directions established by each of the sensors directly supplies the relative orientation angles of the respective sensors. It is understood that each of the sensors may detect the direction by an angle and in three-dimensional space by two angles. Consequently, the method according to the embodiments may also be carried out correspondingly in three-dimensional space.

In the method according to the present embodiments, the at least one movement variable established by of in each case one of the sensors includes at least the velocity of the object along the direction of a straight path connecting the sensor and the object in each case. Expediently, this velocity is detected by of the Doppler effect in the method according to the present embodiments.

In the method according to the present embodiments, the direction of the object, as viewed from the sensor, is established by each one of the sensors and is used to determine the arrangement. By way of example, such a determination of the direction may be carried out by an arrangement of two or more phase-sensitive antennas of a sensor in the case of radar sensors.

In the method according to the present embodiments, the direction of the object, as viewed from the sensor, is established by each one of the sensors and is detected in a manner dependent on the velocity of the object along the direction of a straight line connecting the sensor and the object, wherein the directions in which the established velocity vanishes are used to determine the arrangement. As explained above, the Doppler effect is expediently used in the method according to the present embodiments for the purposes of establishing the velocity. The velocity (as mentioned above) and the direction, characterized by an angle, form a so-called Angle-Doppler trajectory, which, by assignment below forms a circle in a Cartesian coordinate system:

$$v_x' = v_r \cos \phi$$

$$v_y' = v_r \sin \phi, \quad (1)$$

The center point of such a circle is half the component-by-component velocity of the moving object in Cartesian coordinates, as seen from the sensor in each case. The radius of this circle represents half the magnitude of the velocity of the moving object. This circle intersects the origin in accordance with the aforementioned assignment in the coordinates $v_x'$, $v_y'$ precisely if the moving object reaches the closest point of approach to the sensor (e.g., the tangential movement). At this point of closest approach to the sensor, the velocity of the object toward the sensor or away from the sensor is equal to zero. In this case, the measurement reduces to only the angle $\phi$, which specifies the direction in which the object is situated as viewed from the respective sensor. If a plurality of angles $\phi$ of a plurality of sensors are detected, these angles $\phi$ specify the relative orientation of the respective sensors in relation to one another.

Depending on the orientation of the respective sensors, the object may not necessarily be detected at the point of its closest approach to the respective sensor. Therefore, in such cases, the determination of the circular trajectory is expediently determined, as described above, by regression and/or extrapolation (e.g., nonlinear). Expediently, such a nonlinear regression is carried out with a constraint, according to which the origins of the circular trajectories resulting from different measurements of the same sensor are set to be a fixed point. In the aforementioned case of a circular trajectory, the same radius is set for all circular trajectories such that a regression may already be carried out from a first measured value of the sensor.

A deviation in the direction $\phi$ leads to a displacement of the measured value along the circular arc; by contrast, errors in the relative velocity $v_r$ influence the estimated radius of the circle. A change in the movement direction (e.g., a rotation of the velocity coordinates of the moved object) influences all circle centers of all sensors equally and therefore does not influence the angle differences. By contrast, in the case of a non-constant velocity of the moving object, a variable circle radius emerges such that, instead of a fixed circular trajectory, use is suitably made of a piecewise approximation for different circle radii and/or of suitable curve fitting. In a suitable development of the method according to the present embodiments, the distance of the object from the sensor is established by each one of the sensors and the distance is used for determining the arrangement. Expediently, use is made of the time-of-flight of an electromagnetic signal, which is emitted by the sensor and subsequently reflected by the object and received by the sensor again, to establish the distance of the object from the sensor.

Suitably, the distance of the sensors from one another is determined in the method according to the present embodiments. The offset of the sensors from one another is determined in the method in accordance with the present embodiments (e.g., in the style of a translation vector). In this way, both the distance of the sensors from one another and the orientation of the sensors in relation to one another are determined. Therefore, the relative arrangement of the sensors with respect to one another is uniquely set.

The relative orientation of the sensors in relation to one another is used in the method according to the present embodiments for establishing the distance of the sensors from one another (e.g., as explained above). Suitably, the distance of the object from the sensor is additionally established by each one of the sensors and is used to determine the arrangement, and the direction of the object, in which the latter is situated as seen from the sensor, is established and used to determine the arrangement.

If the relative orientation of the sensors in relation to one another is available in the form of relative angles $\theta_{kn}$ between in each case two sensors k, n, a path $d_{nk}$, connecting the two sensors k, n may be deduced (e.g., from the position measurement $p_k$) in accordance with:

$$d_{nk} = p_n - \begin{bmatrix} \cos\theta_{kn} & \sin\theta_{kn} \\ -\sin\theta_{kn} & \cos\theta_{kn} \end{bmatrix} p_k. \quad (2)$$

Suitably, a method as described above is applied to pairs of sensors in the case of the method according to the present embodiments for determining an arrangement of at least three sensors in relation to one another.

The sensor network according to the present embodiments includes at least two sensors and an evaluation device configured to establish at least one movement variable of the moving object by data from each one of the sensors, to link these movement variables or variables derived therefrom in each case, and to use these for determining a relative arrangement of the sensors in relation to one another.

Suitably, the sensor network according to the present embodiments is a wireless sensor network (e.g., a sensor network that is formed with optical sensors, with radar sensors, with sonar sensors, and/or with lidar sensors.

The sensor network according to the present embodiments is a heterogeneous network (e.g., the sensor network includes different sensor types, such as with at least two different sensor types of the group containing optical sensors, radar sensors, sonar sensors and lidar sensors).

DETAILED DESCRIPTION

Figure 1:
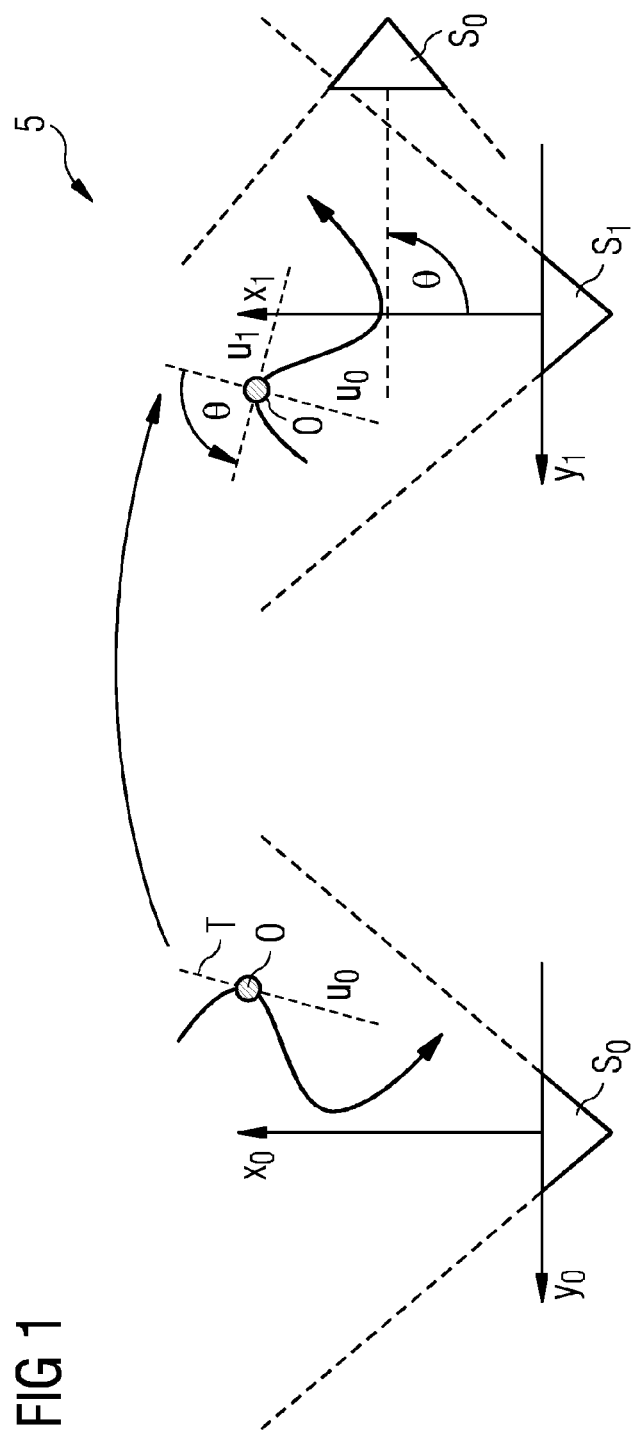
FIG. 1 shows, in a plan view of a schematic diagram, a sensor network according to an embodiment with two radar sensors when carrying out a method according to the present embodiments for determining an arrangement of the radar sensors in relation to one another in the situation of simultaneous detection of a moving object.

The sensor network 5 depicted in FIG. 1 includes a first radar sensor $S_0$ and a second radar sensor $S_1$.

The first and second radar sensor $S_0$ and $S_1$ are each provided to measure the distance R from an object O. The measurement of the distance R to the object O (e.g., equivalently the measurement of the distance R from the object O to the respective radar sensor $S_0$, $S_1$) is carried out in a manner known by a time-of-flight measurement of the radar signal emitted by the radar sensor $S_0$, $S_1$, and each radar signal is reflected by the object O and received by the radar sensor $S_0$, $S_1$. The signals are evaluated by evaluation electronics (not depicted explicitly) for establishing the time-of-flight.

Furthermore, a first and second radar sensor $S_0$, $S_1$ are each provided to measure the direction in which the object O is situated as viewed from the radar sensor $S_0$, $S_1$, and consequently to measure the angle $\phi$ at which the object O appears in relation to a reference direction relative to the radar sensor $S_0$, $S_1$ when viewed from the radar sensor $S_0$, $S_1$ of the radar. The first and second radar sensor $S_0$ and $S_1$ each have a group antenna (not explicitly depicted here), which is provided for a phase-sensitive reception of the radar signal reflected by the object O.

Consequently, the first and second radar sensor $S_0$ and $S_1$ are provided to detect the distance R and the angle $\phi$, specifying the direction of the object O relative to the radar sensor $S_0$, $S_1$. The position of the object O is detected in polar coordinates (R, O) of the respective radar sensor $S_0$, $S_1$, in which the radar sensor $S_0$, $S_1$ lies at the origin.

In the depicted exemplary embodiment, the angle may specify the angle $\phi$ within a plane parallel to the ground, said plane being parallel to the plane of the drawing in the illustrations. Consequently, the angle $\phi$ forms an aspect angle.

In the depicted exemplary embodiments, the object O is a moving object (e.g., a land vehicle, as depicted). Further, not expressly depicted embodiments, the object O may also be any other moving object (e.g., a person, an aircraft or a machine part). The exemplary embodiments are explained first using a uniformly moving object O (e.g., the direction and magnitude of the velocity of the object O are constant in time in the reference system) in which the radar sensors $S_0$, $S_1$ of the sensor network 5 are at rest (extended method acts in the case of a non-uniform movement of the object O are explained in the context of another exemplary embodiment).

The position of the object O is detected in polar coordinates at a known time interval with a time duration Δτ by each one of the radar sensors $S_0$, $S_1$. The detection of the position of the object O in polar coordinates is carried out in a time-synchronous manner by the two radar sensors $S_0$, $S_1$. Hence, a movement variable, namely the change in position of the object O during the time duration Δτ is detected by each one of the radar sensors $S_0$, $S_1$. A change in position over time of the object O corresponds to the velocity u of the object O and this may be expressed in vectors in Cartesian coordinates x, y relative to each radar sensor $S_0$, $S_1$:

$$u = \left[\frac{\partial x}{\partial \tau}, \frac{\partial y}{\partial \tau}\right], \quad (3)$$

In the case of the uniform movement of the object O, the velocity u of the object O corresponds to the change in position of the object O during the time duration Δτ (in the case of deviations of the movement of the object O from the uniform movement, the time duration Δτ is selected to be sufficiently small such that the instantaneous velocity u is detectable with a sufficiently accurate approximation by the change of position over time of the object O during the time duration Δτ, as specified above).

This direction of the velocity u is an inherent property of the movement of the object O and therefore independent of the absolute position of the target, and of the relative distance of the radar sensors $S_0$, $S_1$ from one another.

The magnitude of the velocity u detected by the radar sensors $S_0$, $S_1$ is independent of the circumstances by which the radar sensors $S_0$, $S_1$ are established.

However, the measured movement direction depends directly on the direction in which the object O is situated as seen from the radar sensor $S_0$, $S_1$ (e.g., the angle φ at which the object O appears fixed in relation to the radar sensor $S_0$, $S_1$ in relation to a reference direction) as viewed from the radar sensor $S_0$, $S_1$ of the radar, and consequently the movement direction depends directly on the orientation of the radar sensor $S_0$, $S_1$.

If the radar sensor $S_0$, $S_1$ is rotated about a direction perpendicular to the ground, the angle φ changes by precisely the negative rotation. The angle of intersection of the velocity directions detected by two radar sensors at the in each case equivalent instant therefore directly supplies the relative orientation of the radar sensors $S_0$, $S_1$ with respect to one another:

$$\theta_{01} = \arccos\left(\frac{u_0 \cdot u_1}{\|u_0\| \cdot \|u_1\|}\right) \quad (4)$$

where $u_0$ denotes the velocity vector of the object O measured by the radar sensor $S_0$ and $u_1$ denotes the velocity of the object O measured by the radar sensor $S_1$ (FIG. 1). In the case of a plurality of radar sensors, the relative orientation of the radar sensors $S_n$, $S_k$ in relation to one another is given by:

$$\theta_{nk} = \arccos\left(\frac{u_n \cdot u_k}{\|u_n\| \cdot \|u_k\|}\right) \quad (5)$$

where the velocity vector $u_n$ denotes the velocity of the object O measured by the radar sensor $S_n$ and the velocity vector $u_k$ denotes the velocity of the object O measured by the radar sensor $S_k$.

Figure 2:
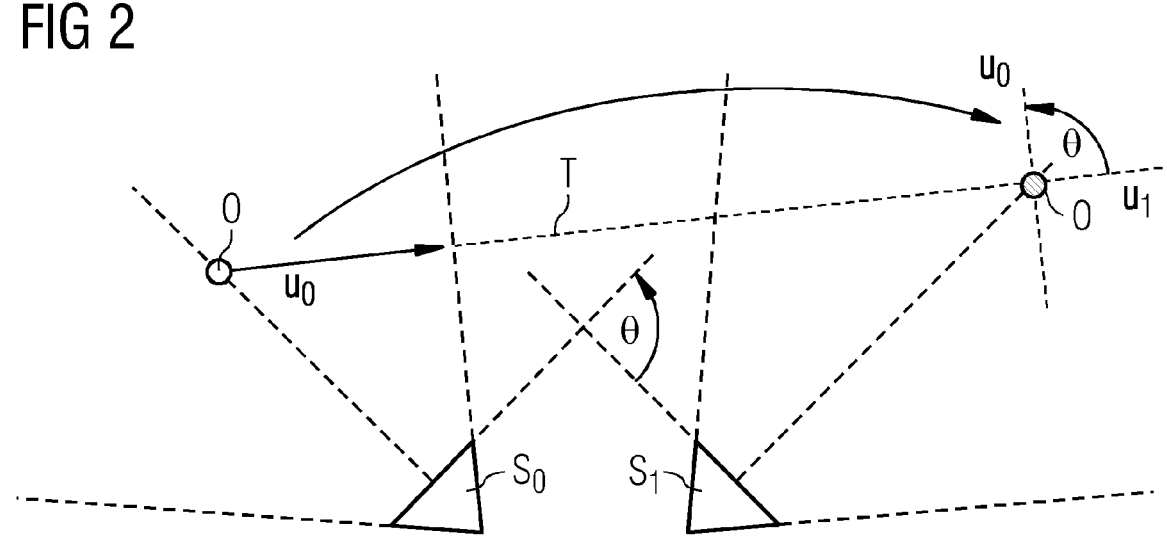
FIG. 2 shows, in a plan view of a schematic diagram, the sensor network in accordance with FIG. 1 when carrying out the method according to the embodiment in accordance with FIG. 1 in the situation of a non-simultaneous detection of a moving object.

If the target is not simultaneously observable by both sensors, a trajectory up to the temporal intersection is extrapolated based on a movement model or previous measured values (FIG. 2).

In the case of synchronous detection of the positions of the object O by the radar sensors $S_0$, $S_1$, the method is moreover robust in relation to changes in the velocity vector u (e.g., changes in the magnitude or the direction of the velocity u).

Figure 3:
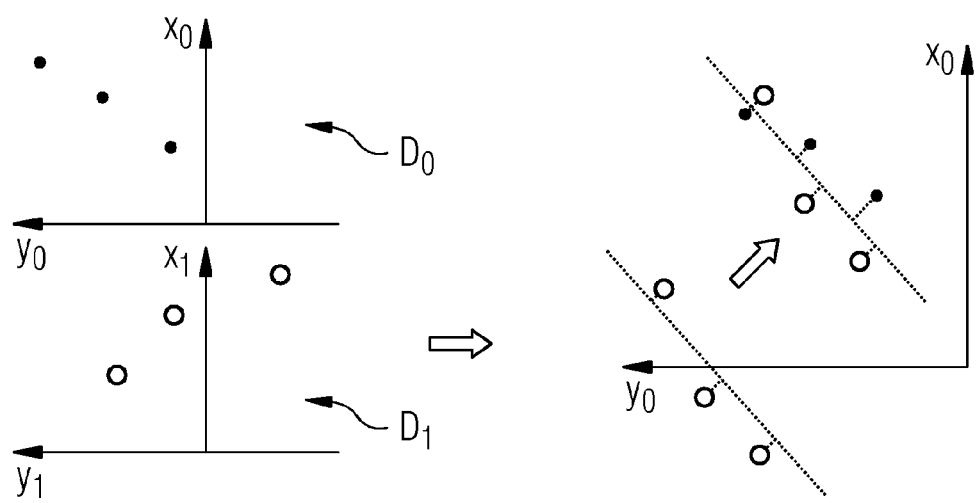
FIG. 3 shows, in a diagram, a taking account of the plurality of measured values for each radar sensor of the sensor network according to the embodiment in accordance with FIG. 1 when carrying out the method according to the present embodiments.

It suffices to detect the velocity $u_0$ and $u_1$ of the object O once by each radar sensor $S_0$, $S_1$. However, in the depicted exemplary embodiment, measurement inaccuracies are reduced with an increasing number of detected velocities by suitable estimation methods or filtering (e.g., least squares method, FIG. 3).

In order to completely determine the arrangement of the radar sensors $S_0$, $S_1$ in relation to one another, the offset of the radar sensors $S_0$, $S_1$ in relation to one another is determined.

The offset is calculated as a translation vector between the radar sensors $S_0$, $S_1$ with the aid of the relative orientation $\theta_{01}$ and the positions $p_k$, $p_n$ of the object O.

If the relative orientation $\theta_{01}$ between two radar sensors $S_0$, $S_1$ is known (e.g., by carrying out the method according to the present embodiments as described above) the offset of the radar sensors $S_0$, $S_1$ may be determined directly.

in the offset may be determined in accordance with:

$$d_{nk} = p_n - \begin{bmatrix} \cos\theta_{kn} & \sin\theta_{kn} \\ -\sin\theta_{kn} & \cos\theta_{kn} \end{bmatrix} p_k, \quad (6)$$

wherein the position vector $p_k$ of the object O, established by the radar sensor K, is rotated relative to the radar sensor K with the relative orientation $\theta_{kn}$ between the radar sensors $S_k$ and $S_n$ (e.g., by a passive rotation matrix), or with the relative orientation $\theta_{kn}$ between the radar sensors $S_n$ and $S_k$ (e.g., by an active rotation matrix), and it is displaced by the position vector $p_n$ of the object O relative to the radar sensor $S_n$, which is established by the radar sensor $S_n$ in a temporally synchronous manner to the establishment of the position vector $p_k$.

In order to carry out this method, one establishment of the position vector $p_k$, $p_n$ per radar sensor $S_k$, $S_n$ is sufficient. However, measurement inaccuracies are reducible, as described above based on FIG. 3, by virtue of seeking for an error minimization (e.g., a best-possible superposition of a plurality of measured values) instead of directly determining the offset, as described above (e.g. FIG. 3).

This method is also robust in relation to changes in velocity or direction of the object O in the case of simultaneous position measurements.

As an alternative or in addition to the aforementioned determination of the relative orientation $\theta_{01}$ of the radar sensors $S_0$, $S_1$ in relation to one another, it is also possible to estimate the orientation from a nonlinear regression.

To this end, radar sensors $S_0$, $S_1$ are used in this further exemplary embodiment of the method, said radar sensors at least being provided to establish the direction of the object O in which the latter is situated as seen from the radar sensor and to establish at least the velocity of the object O along the direction of a path in each case connecting the radar sensor and the object. Here, like in the exemplary embodiments described above, the direction of the object O is expressed by the angle ϕ. The velocity of the object O along the direction of a path connecting the radar sensor and the object O is denoted by $v_r$.

In the case of constant velocity vector u of the object O, the time evolution of the variables ϕ, $v_r$ describes a circle K in the Cartesian space defined by:

$$v_x'=v_r \cos \phi$$

$$v_y'=v_r \sin \phi. \qquad (7)$$

The center point of this circle K is:

$$\left[\frac{v_x}{2}, \frac{v_y}{2}\right], \qquad (8)$$

For example, half the component-wise velocity of the object in the x- and y-direction from the respective view of the radar sensor $S_0$, $S_1$.

$$\frac{|v|}{2}$$

The radius represents half the magnitude of the velocity u of the object.

Because $v=\sqrt{v_x^2+v_y^2}$ applies, this circle potentially intersects the origin at $(v_x', v_y')$, namely precisely if the object O reaches the point of closest approach to the radar sensor (e.g., if it reaches a tangential point of the tangential movement). The tangential point, $v_r=0$ m/s is known (e.g., the measurement reduces to the measurement of the angle ϕ of the radius at this tangential point).

Figure 4:
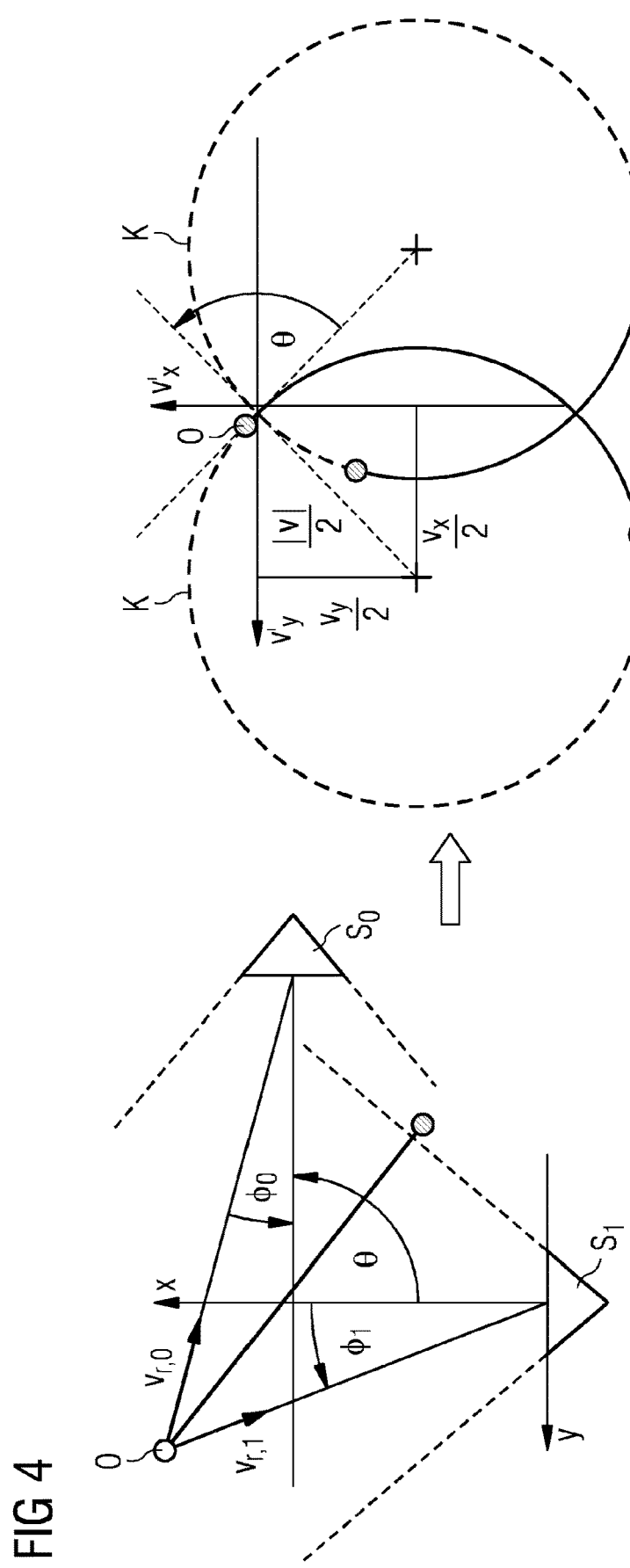
FIG. 4 shows, in a plan view of a schematic diagram, a further exemplary embodiment of a sensor network with two radar sensors when carrying out a further exemplary embodiment of the method according to the present embodiments in the situation of simultaneous detection of a moving object.
Figure 5:
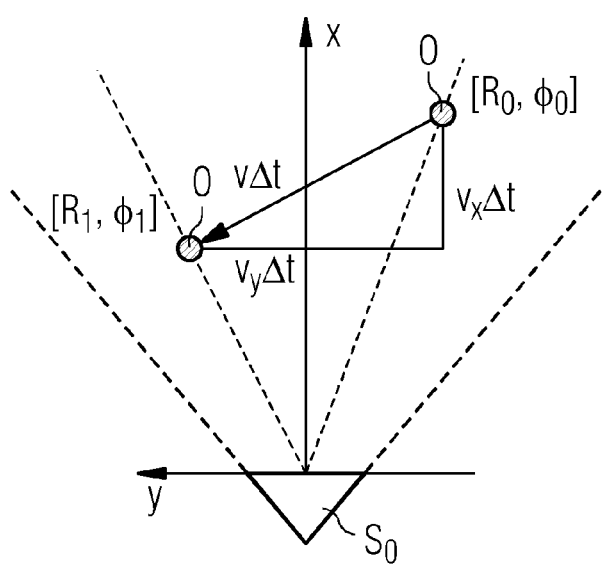
FIG. 5 shows, in a plan view of a schematic diagram, a further exemplary embodiment of the sensor network with two radar sensors when carrying out a further exemplary embodiment of a method according to the present embodiments in the situation of simultaneous detection of a moving object.

As described above in relation to FIGS. 1 and 2, the relative orientation θ is therefore given, analogous to (7) by the angle of intersection of the tangent line at the origin (FIG. 4).

In many cases, an object O will never reach the tangential point (e.g., not simultaneously from the view of two spatially offset radar sensors). Therefore, the trajectory for each radar sensor is approximated or extrapolated for the purposes of determining the tangent line by nonlinear regressions or other suitable methods. Constraints for this optimization problem are the origin being a fixed point and, in the exemplary case of a circle K, an equal radius for all circles K. Therefore, the regression may be carried out from the first measured value. A deviation in the angle ϕ leads to a displacement of the measured value along the circular arc; a circulation is π. Errors in the velocity $v_r$ of the object O along the direction of the path connecting the radar sensor $S_0$, $S_1$ and the object O by contrast influence the estimated radius of the circle K.

A change in the movement direction (e.g., a rotation of the velocity coordinates) displaces all circle centers equally and therefore does not influence the angle of intersection of the tangent at the origin. If the velocity v of the object O is not constant, this is expressed in a variable radius, and so a suitable piecewise approximation for variable circle radii or generic curve fitting is used instead of a fixed circular trajectory.

As an alternative to estimating the translation vector (e.g., the offset of the radar sensors $S_0$, $S_1$ in relation to one another), there may also be fitting of movement vectors in ϕ-curves.

If, as assumed below, only measured values of the angle ϕ are available, the distance R of the object O from each radar sensor $S_0$, $S_1$ may be estimated.

If the movement of the object O (e.g., the velocity vector) is represented in polar coordinates, the following emerges with the time difference Δt between the measured values:

$$\frac{\partial x}{\partial \tau} = v_x \Delta t = R_i \cos\phi_i - R_j \cos\phi_j \qquad (9)$$

$$\frac{\partial y}{\partial \tau} = v_y \Delta t = R_i \sin\phi_i - R_j \sin\phi_j.$$

In conjunction with the angles $\phi_i \neq \phi_j$, the movement vector or the distance thereof from the radar system is unique in a global coordinate system. In the matrix form, equation (9) is directly solvable according to:

$$\begin{bmatrix} R_i \\ R_j \end{bmatrix} = \begin{bmatrix} \cos\phi_i & -\cos\phi_j \\ \sin\phi_i & -\sin\phi_j \end{bmatrix}^{-1} \begin{bmatrix} v_x \\ v_y \end{bmatrix} \Delta t. \qquad (10)$$

The calculated distances $R_i$ and measured angles $\phi_i$ are transformed into Cartesian coordinates for radar sensors n and k, whereupon the position $P_{i,n}=[x_{i,n}, y_{i,n}]$ and $P_{i,k}$ of the object O is known and the relative translation vector is given in accordance with equation (5). Alternatively, equations (9) and (10) may also be formulated directly in Cartesian coordinates. Here, one measured value per radar sensor is enough to calculate the translation vector. The robustness of the method is determined, firstly, by the accuracy of the velocity vector and, secondly, by the angle range $|\phi_i-\phi_j|$ that has been passed through (and is as large as possible).

In addition to the method presented here, further evaluation methods are conceivable, depending on the curve of the movement variables (e.g., the movement model of the object O). To this end, for example, use may be made of an acceleration of the object O, a defined curve trajectory of the object O, and other movement variables characteristic for a movement model. Movement variables render it possible to detect a trajectory of the movement variable as an arbitrary mathematical function. By the inclusion of a further angle (e.g., an elevation angle ψ) all exemplary embodiments listed above are also extendable to the three-dimensional case.

Like in the exemplary embodiments explained above depicted in FIGS. 1 to 5, the method for determining an arrangement is decomposable into two partial methods: the relative rotation; and the relative translation between in any case two radar sensors of the radar sensor pair are determined.

The application to all pairs of radar sensors therefore enables a global "sensor map" to be constructed. Here, the assumption is made either that the fields of view of two radar sensors overlap in the region of the target measurement or that the target follows from a known or sufficiently predictable movement model in the case of non-overlapping regions.

By way of example, a rotation may be determined from gradients of the position trajectory of the object O and, subsequently, a translation of positions of the object O in the (R, Φ)-space, or it is possible to undertake a determination of the rotation from nonlinear regressions in the (Φ, $v_r$)-space (e.g., referred to as Angle-Doppler space below) and optionally a subsequent determination of the translation, as described above, and optionally a subsequent determination of the translation by fitting estimated movement vectors into angle trajectories.

The method may be used equally for radar sensors and optical sensors, sonar sensors, lidar sensors or any other wireless sensors, provided that corresponding measurement variables are available. If the cost effective system is sought after, the determination only in the Angle-Doppler space offers clear advantages: a simple continuous wave sensor is sufficient for measuring the Doppler frequency; and the angle measurement may already take place by way of a phase comparison of only two reception channels. In general, the use of Doppler frequencies offers a metrological advantage, as the achievable measurement accuracy and resolution and the measurement range are coupled less to the frequency or bandwidth approval, and instead are coupled to the available measurement time. Moreover, all methods, as described above, may be combined or carried out in parallel, and therefore it is possible to increase the reliability and robustness of the position estimation. Depending on the expected/measured trajectory of the object O and fluctuations of the measured values, there is also the option of switching between the methods automatically (e.g. based on plausibility evaluations). Likewise, it is possible and expedient to embed the pairwise inherent localization into a global, continuously learning model in order to minimize estimation errors.

All depicted methods are worded and solvable in a closed deterministic manner, which accommodates the implementability and reproducibility at all times.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for determining a relative arrangement of at least two sensors in relation to one another, the method comprising:
    detecting a moving object by the at least two sensors;
    establishing a velocity of the moving object relative to each sensor of the at least two sensors by the respective sensor of the at least two sensors, wherein the velocity of the moving object relative to each sensor is a velocity of the moving object along a direction of a line connecting the respective sensor and the moving object; and
    determining the relative arrangement of the at least two sensors in relation to one another by using the velocity of the moving object relative to each sensor of the at least two sensors or variables derived from the velocity of the moving object relative to each sensor of the at least two sensors.

2. The method as claimed in claim 1, wherein the relative arrangement of the sensors comprises at least a relative orientation of the sensors in relation to one another.

3. The method as claimed in claim 1, wherein an angle between movement directions of the moving object, established by the at least two sensors, is determined and used for determining the relative arrangement of the at least two sensors in relation to one another.

4. The method as claimed in claim 1, wherein for each sensor of the at least two sensors in a direction of the moving object, the direction of the moving object as observed by the respective sensor is established and used for determining the relative arrangement of the at least two sensors in relation to one another.

5. The method as claimed in claim 4, wherein, by each sensor of the at least two sensors, the direction of the moving object as observed by the respective sensor is established and detected in a manner dependent on a velocity of the moving object along a direction of a line connecting the respective sensor of the at least two sensors and the moving object, and
    wherein directions in which the established velocity vanishes are used for determining the relative arrangement of the at least two sensors in relation to one another.

6. The method as claimed in claim 1, wherein, by each sensor of the at least two sensors, a direction of the moving object as observed by each sensor of the at least two sensors is established and detected in a manner dependent on the velocity of the moving object along the direction of the line connecting the respective sensor of the at least two sensors and the moving object, and
    wherein directions in which the established velocity vanishes are used for determining the relative arrangement of the at least two sensors in relation to one another.

7. The method as claimed in claim 1, wherein, by one of the at least two sensors, a distance of the moving object from the sensor is established and used for determining the relative arrangement of the at least two sensors in relation to one another.

8. The method as claimed in claim 1, wherein an offset of the at least two sensors in relation to one another is determined.

9. A sensor network comprising:
    at least two sensors; and
    an evaluation device configured to establish a velocity of a moving object from data of each sensor of the at least two sensors, to link the velocity of the moving object or variables derived from the velocity of the moving object, and to use the velocity of the moving object or the variables derived from the velocity of the moving object for determining a relative arrangement of the at least two sensors in relation to one another,
    wherein the velocity of the moving object is configured to be established, relative to each sensor of the at least two sensors, by the respective sensor of the at least two sensors, and
    wherein the velocity of the moving object relative to each sensor of the at least two sensors is a velocity of the moving object along a direction of a line connecting the respective sensor and the moving object.

* * * * *